United States Patent [19]
Ballard et al.

[11] Patent Number: 4,822,701
[45] Date of Patent: Apr. 18, 1989

[54] SOLID ELECTROLYTES

[75] Inventors: Dennis G H Ballard, Chester; Philip Cheshire, Wigan; Josef E. Przeworski, Chester, all of England

[73] Assignee: Imperial Chemical Industries PLC, London, England

[21] Appl. No.: 95,264

[22] Filed: Sep. 11, 1987

[30] Foreign Application Priority Data

Sep. 19, 1986 [GB] United Kingdom ................ 8622576
Apr. 30, 1987 [GB] United Kingdom ................ 8710310

[51] Int. Cl.$^4$ .......................................... H01M 6/16
[52] U.S. Cl. ................................... 429/192; 252/62.2
[58] Field of Search ....................... 429/192; 252/62.2

[56] References Cited

U.S. PATENT DOCUMENTS

| | | | |
|---|---|---|---|
| 4,060,673 | 11/1977 | Dey | 429/192 |
| 4,230,549 | 10/1980 | D'Agostin et al. | 429/192 X |
| 4,303,748 | 12/1981 | Armand et al. | 429/192 |
| 4,654,279 | 3/1987 | Bauer et al. | 252/62.2 X |

OTHER PUBLICATIONS

Kelly et al., "Polyethylene Oxide Electrolytes for Operation at Near Room Temperature", Journal of Power Sources, 14 (1985) 13-21.

Primary Examiner—Stephen J. Kalafut
Attorney, Agent, or Firm—Cushman, Darby & Cushman

[57] ABSTRACT

AN electrochemical cell which comprises a conductive anode and cathode capable of mutual electrochemical reaction and separated by a solid electrolyte comprising:
(a) a matrix of sheets of atoms, having side-chains linked to the sheets, which side chains comprise polar groups free from active hydrogen atoms,
(b) a polar aprotic liquid dispersed in the matrix, and
(c) a highly ionized ammonium or alkali metal salt dissolved in the matrix and/or liquid, a cathode therefor, the electrolyte per se, and processes for the preparation of the electrolyte and the cathode.

10 Claims, 1 Drawing Sheet

SOLID ELECTROLYTES

This invention relates to batteries (electrochemical cells) and capacitors which comprise a solid electrolyte, a cathode for such cells, the electrolyte itself and processes for the preparation of the electrolyte and the cathode.

We have found that a specific type of solid electrolyte which contains liquid, is nevertheless advantageously dry in handling, is dimensionally stable and flexible, and has good elastically resilient compression properties and unexpectedly good conductivity. The electrolyte is thus suitable for and enables the production of high energy density devices, eg batteries having an unexpectedly high power density (ie power per unit weight) and capacitors having an unexpectedly high capacitance density, similarly defined at room temperature. This type of solid electrolyte is further described hereinafter and is known herein as 'the Solid Electrolyte'.

Accordingly the present invention provides an electrochemical cell or an electrolytic capacitor which comprises a conductive anode and cathode separated by the Solid Electrolyte, and, in the case of the cell, capable of mutual electrochemical reaction.

In a preferred embodiment the anode, cathode and Solid Electrolyte are thin films, so that the battery or capacitor itself is highly compact and is flexible so that it is conformable to any desired shape.

The present invention also provides the Solid Electrolyte itself.

The Solid Electrolyte comprises:
(a) a matrix of sheets of atoms, having side-chains linked to the sheets, which side chains comprise polar groups free from active hydrogen atoms,
(b) a polar aprotic liquid dispersed in the matrix, and
(c) an ionised ammonium, alkali metal or alkaline earth metal salt dissolved in the matrix and/or liquid.

The sheets of atoms in the matrix (to which the side chains are linked) may be for example: essentially organic sheets, such as sheets comprising organic polymer chains optionally comprising sulphur, nitrogen, phosphorus or oxygen atoms; inorganic-organic sheets, such as ones comprising silicon and oxygen atoms, for example comprising polymeric polysiloxane chains; or inorganic sheets such as aluminosilicate sheets derived from clays.

Where the sheets comprise organic or inorganic-organic polymer chains, each sheet may consist essentially of optionally cross-linked polymer chains. These are favourably hydrocarbons, polyethers or polysiloxanes optionally with cross-linking functions eg oxy or cross-linked —C═C— groups. Preferably such cross-linked sheet chains contain no, or at most a few, free cross-linking eg —C═C— functions.

The cross-linking eg —C═C— functions are favourably pendent and may be in the side chains, e.g. in a terminal position.

For good mechanical properties, eg tear resistance and to ensure that at a chosen loading of polar liquid the Solid Electrolyte remains solid, it is desired that the sheet chains are cross-linked. However, excessive cross-linking tends to affect other desired physical properties of the Solid Electrolyte adversely, for example extensibility, feasible liquid loading levels and the conductivity of the Solid Electrolyte. The optimum degree of cross-linking will be dictated by a balance of such properties and will vary widely with the specific matrix material (inter alia). Within the composition ranges of the Solid Electrolyte given hereinafter such optimisation is largely a matter of routine trial. However, by way of example it is often suitable if 2 to 8% of the monomer units of the sheet chain backbones are cross-linked, often via functions pendent from such units. Sheet chains typically average 2,500 to 10,000 backbone units per chain with 50 to 800 cross-links per chain.

Where each sheet consists essentially of cross-linked polymer chains (organic or inorganic-organic), each chain is favourably linked to an average of at least 2, and preferably at least 4, for example within such preferred chains 10 to 10,000, side-chains (as hereinbefore defined).

The polar groups in such side-chains may for example be ester or ether linkages.

Where each sheet (favourably) consists essentially of cross-linked hydrocarbon, polyether or polysiloxane chains, the side-chains are favourably end-capped polyether or polyether ester, such as polyalkylene oxide, or polyalkylene oxide carbonate side-chains linked to the sheet chains by oxy, or for hydrocarbon and polyether claims, oxycarbonyl or carbonate groups.

By 'end-capped' herein is meant that terminal OH groups in such chains are replaced by groups without active hydrogen atoms, eg ether or ester groups.

In such favoured sheets and side-chains, the equivalent ratio of side-chain polar groups (excluding any linking groups) to total carbon atoms in the matrix may suitably be in the range 2:3 to 1:6, preferably 2:3 to 1:4, such as 1:2 to 1:3.

Favoured polyether sheet chains with side-chains of the above favoured polyether types may be made for example by copolymerising monomers comprising ethylene and/or propylene oxide with for example a compound selected from butadiene monoxide, glycidyl methacrylate, glycidyl acrylate and vinyl glycidyl ether and in addition with glycidol.

The free —OH groups resulting from the glycidol and the terminal —OH groups of the polyether chains may be reacted with alkylene oxides, preferably ethylene oxide and optionally derivatives thereof, using for example a basic or acidic catalyst to form side-chains comprising polar groups as aforesaid. The free OH groups may be reacted to eliminate the active hydrogen atoms ('capped'), (for example by forming alkoxy groups) by reacting them with an alkyl halide for example methyl chloride in the presence of a basic catalyst or by forming ester groups with a carboxylic acid or anhydride.

Where any of the foregoing sheet chains contain —C═C— groups, the chains may be cross-linked within the sheets using for example free radical or γ-radiation, generally after side chain formation and capping (if effected).

Cross-linking may also be achieved even if no unsaturated groups are present, for example, with free radical forming substances for example peroxides, such as benzoyl peroxide, optionally with heating. However, this procedure may cause adhesion of the matrix to a vessel in which it is made, and the degree of cross-linking may be so low that the mechanical properties (eg tear resistance) of such matrices are impaired, and it is thus generally preferred that cross-linking should take place by reaction of cross-linking functions eg —CO═C— groups.

Favoured hydrocarbon sheet chains may be preformed by polymerisation of —C═C— groups, and optionally subsequently or synchronously cross-linking the chains, optionally via cross-linkable functions eg (favourably pendent) —C═C— functions.

Thus, for example, sheet chains may be formed by polymerisation of a first monomer species comprising a single —C═C— function and a side chain moiety as defined hereinbefore, optionally together with a second monomer comprising two —C═C— functions to provide at least one cross-linkable —C═C— function for the final sheet chain, which is often pendent and often in a side-chain as defined. The side-chain moiety may be a favoured end capped polyether or polyether ester chain. Thus for example the first monomer species may be a methoxy polyethylene oxide methacrylate or acrylate, optionally copolymerised with allyl methacrylate or acrylate as comonomer, or a polyethylene oxide dimethacrylate or diacrylate, or a polystyrene oxide carbonate dimethacrylate or diacrylate, subsequently homopolymerised.

End-capping of side-chains and cross-linking of the sheet chains may be effected as described above, in the case of cross-linking, whether cross-linking —C═C— groups are present or absent.

The relevant polymerisation of monomer —C═C— groups may be effected using free radical or group transfer initiation or γ-radiation. Such conditions may intrinsically, or may be adjusted to, also effect synchronous or immediately subsequent cross-linking, so that cross-linked matrix formation from monomer may be run as a one-pot process, in particular where a difunctional comonomer is used.

Where the sheets are organic-inorganic sheets comprising polysiloxane chains, the chains (together with the side-chains linked thereto) are preferably of the formula:

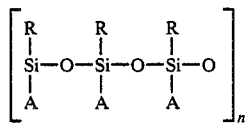

wherein each group R independently is alkyl or optionally cross-linked alkenyl, preferably $C_{1-6}$ alkyl or optionally cross-linked $C_{1-6}$ alkenyl, in particular methyl or cross-linking oxy, and each group A is a group as defined for R (with the same preferred groups as for R) of a side-chain (as hereinbefore defined) comprising an end-capped polyether or polyether ester, eg a capped polyalkylene oxide or polyalkylene oxide carbonate group, at least 20% and preferably at least 40% of the groups A being such side chains.

Such polysiloxane chains may be cross-linked within the sheets through the groups R when oxy, or through —C═C— functions in R and/or A (as defined). Corresponding matrices preferably contain no, or at most few, free —C═C— functions.

In the case of sheets of this type the matrix may suitably be made by performing individual chains, and subsequently end-capping side-chains if desired as described hereinbefore, and then cross-linking by heating. For R oxy cross-linking functions, corresponding sheet chains, but wherein R is H, are preformed and sufficient water is allowed to be present to provide the desired number of oxy functions. It is preferred that cross-linking should be carried out in an inert atmosphere, for example of nitrogen. Oxygen may be present if desired but tends to accelerate cross-linking and thus produces a "skin" on any surface of the material which is in contact with it.

Where no unsaturation is present free radical transfer initiated cross-linking may be effected as described for organic polymer sheets hereinbefore.

Where the sheets are inorganic, for example, aluminosilicate sheets, the sheets may be formed and the side chains (as defined) may be added to such sheets conventionally.

From the foregoing it will be seen in summary that the matrix may be formed inter alia by
 (a) adding the side chains (as defined) to a matrix of corresponding sheets without side chains or
 (b) cross-linking a matrix of polymer chains with side chains (as defined) linked to the polymer chains.

In case (b) the initial or product matrix favourably is one which does not readily crystallise at 0° to 100° C. Matrix formation by any of the foregoing methods will generally be effected during production of the Solid Electrolyte as described further hereinafter.

Suitable polar aprotic liquids dispersed in the matrix may be any compatible with the rest of the Solid Electrolyte, but include any such liquids with a dielectric constant of at least 20, preferably at least 50 and/or a dipole moment of at least 1.5, preferably at least 3 Debye. The liquid may be a pure liquid or mixture (mutual solution) of liquids or a solution of a solid solute other than the salt component (c) as defined hereinbefore of the Solid Electrolyte. Within the above, suitable and preferred liquids are those which comprise or have a component comprising an $NO_2$, CN or (favourably) an —$A_1$—E—$A_2$— group where $A_1$ and $A_2$ each independently are a bond, —O—, or —NR— where R is $C_{1-4}$ alkyl and E is —CO—, —SO—, —$SO_2$—, or —P(O)$A_3$— where $A_3$ independently is as defined for $A_1$ and $A_2$, or —O— when $A_1$ and $A_2$ are each a bond.

Such liquids or components thereof may also contain other substituents known to increase polarity, but without acidic hydrogen atoms such as secondary amino, esterified carboxyl and, such optionally substituted aminocarbonyl groups.

Within suitable and preferred polar aprotic liquids or components comprising an —$A_1$—E—$A_2$— group are those of formula $R_1$—$A_1$—E—$A_2$—$R_2$ including $R_1$—$A_1$—P(O)($A_3$—$R_3$)—$A_2$—$R_2$ where $R_1$, $R_2$ and $R_3$ are each independently hydrogen or optionally substituted hydrocarbyl or $R_1$ and $R_2$ together are optionally substituted hydrocarbadiyl (to form a cyclic $R_1$—$A_1$—E—$A_2$—$R_2$ compound), for example $C_{1-10}$ alkyl optionally non-terminally oxa-substituted, including $C_{1-4}$ alkyl, and $C_{2-6}$ alka-α,ω-diyl respectively.

Such liquids or components thereof thus include amides (—CONR—) such as dialkyl formamides for example dimethylformamide and N-methyl pyrrolidone, sulphoxides (—SO—) such as dimethylsulphoxide and thiophene-1-oxide, sulphones (—$SO_2$—) such as dimethylsulphone and sulpholane, carbonates (—O—CO—O) such as optionally oxa-substituted dialkyl and alkylene carbonates, for example diethyl, dipropyl, and bis(polyalkoxy alkyl) carbonates, including bis(methoxy ethoxyethyl) and bis(methoxy propoxypropyl) carbonates, and ethylene and propylene carbonates.

A group of such liquids include ethylene or propylene carbonate, a dialkyl formamide or —sulphoxide preferably where each alkyl group is $C_{1-4}$ alkyl, or a cyclic ether, for example tetrahydrofuran, or higher viscosity liquids such as sulpholane or higher molecular weight congeners of the foregoing, for example bis(polyalkoxyalkyl) carbonates such as bis(methoxyethoxyethyl) carbonate.

Favoured liquids include cyclic amides such as N-methylpyrrolidone, and cyclic carbonates such as propylene carbonate.

The liquid may typically be present in the matrix as 5 to 250 parts by weight, favourably 35 to 200 parts by weight, per 100 parts by weight of the matrix.

Clearly the matrix should be in practical terms insoluble in the polar aprotic liquid, or, if soluble, the concentration of liquid in the matrix should be insufficient to dissolve the matrix to any appreciable extent. Of course where any salt is insoluble in the matrix the liquid concentration should be sufficient to dissolve the salt adequately. Suitable materials, and concentrations, within these constraints will be evident or a matter of routine trial.

The ions in the ionised ammonium, alkali metal or alkaline earth metal salt dissolved in the matrix and/or liquid may be (preferably) totally discrete and separated or may exist as ion pairs or higher aggregates (e.g. triple ions). The salt may suitably be a salt of $NH_4$, Na, K, Li or Mg, favourably Na, K, or Li, and preferably Li. Suitable examples of the salt anion include mono- and divalent anions, inter alia $I^-$, $SCN^-$, $PF_6^-$, $AsF_6^-$, $BCl_4^-$, $BPh_4^-$, alkaryl sulphonate ions, and (preferably) $CF_3SO_3^-$, $ClO_4^-$ and $BF_4^-$. A preferred salt is lithium triflate $CF_3SO_3Li$. Mixtures of salts may be used.

The salt may typically be present in the matrix in a matrix:salt equivalent weight ratio of 1 equivalent part by weight of salt per 80 to 18,000 parts by weight of matrix, favourably 200 to 18,000, more favourably 200 to 7000 and preferably 400 to 7000 parts by weight. Where the matrix contains oxygen atoms in the side chains and/or the sheets, these ratios may be expressed in terms of equivalents of matrix oxygen atoms. The salt may be present as 1 equivalent per 4 to 100 equivalents matrix oxygen atoms, favourably per 10 to 40 equivalents.

In a further aspect of the invention, the Solid Electrolyte may be made by a process comprising in any feasible order:

(a) forming the matrix
(b) incorporating the highly ionised salt in the matrix or a precursor thereof, and
(c) introducing the aprotic liquid into the matrix or a precursor thereof.

In the case of an organic or organic-inorganic polymer matrix the steps are preferably carried out in the order (b), (a) and (c).

In such case, the salt is incorporated in a matrix precursor which may be a non-cross-linked polymer precursor of a cross-linked matrix, or an oligomer or monomer, or a mixture of such species, which is a precursor of a non cross-linked or cross-linked polymer matrix. Matrix formation may thus involve polymerisation and/or cross-linking, which may also be effected with or without a solvent or vehicle.

In brief, in such a case, in step (b) the salt or a solution thereof is dissolved in the matrix precursor or a solution thereof, the precursor is polymerised and/or cross-linked in step (a), as necessary with removal of solvents, to form a solid matrix, and in step (c) the aprotic liquid is introduced. Step (c) may be effected for example by exposing the product to the vapour of the liquid, if necessary under vacuum and/or elevated temperature. For incorporating larger quantities of liquid it may be necessary to immerse the matrix in the liquid. To prevent leaching or osmosis of the salt from the matrix the liquid should contain more of the salt eg as a 1 or 2M solution. To prevent incorporation of further salt in the matrix the chemical potentials of the salt in the matrix before dipping and in the solution should be roughly matched, unless of course it is desired to incorporate further salt in this way. However, for some salts in some matrices and liquids, higher concentration of the salt may unfavourably decrease the conductivity of the Solid Electrolyte, possibly by ion aggregate formation. The optimisation of the conductivity is a matter of ready and routine trial as shown for example in the Table (E4.1) to (E4.4) hereinafter.

In an electrochemical cell or an electrolytic capacitor, the Solid Electrolyte may be of any thickness provided it is cohesive and continuous, and it is clearly advantageous and preferred that it be as thin as possible. It may typically be from 1000 to $2\mu$ thick, for example 200 to $10\mu$ and 100 to $10\mu$. As for the electrodes (described hereafter), at lower thicknesses it will have to be applied to a support, ie the anode and/or the cathode (either of which may in turn be supported as hereafter described), and painting a precursor onto a support and forming the matrix in situ may be desirable.

The electrodes in a capacitor may be of any suitably inert and conductive material eg a metal conventionally used in such devices. Conductive current collectors additional to and in contact with the electrodes will not generally be necessary.

The anode in a cell generally comprises a material capable of oxidative electron loss to form a cationic species. The cathode generally comprises a material correspondingly capable of receiving electrons to be reduced (ie a 'potential oxidant'). In one embodiment these electrode processes are reversible so that the cell is a secondary cell.

Thus for example the anode may suitably be or comprise an alkali metal such as Na, K or preferably Li. The metal may be comprised as an alloy component for example in a lithium aluminium alloy or less favourably as a dopant in a potentially salifiable ('conductive') polymer in particular one with an extended delocalised electron system, for example poly(p-phenylene) or polyacetylene. Often the anode material will be or comprise the same element as any alkali metal cation of the highly ionised salt in the Solid Electrolyte. In such cases the matrix should not contain any hydrogen atoms reactive to anode metal, for example such atoms $\alpha$ to carbonyloxy groups. The anode is conveniently a thin foil, sheet or plate.

The anode may be of any thickness provided it is cohesive and continuous, and it is clearly desirable that it be as thin as possible (provided that the cell does not rely on conduction in the plane of the electrode). The anode may typically be from 2500 to 5 micron thick, for example 250 to 50 micron. It will be appreciated that at lower thicknesses the anode will have to be applied to a support, for example a cell wall and/or the electrolyte. It may even be necessary to apply the anode to the support eg by vapour deposition. Such a support may be or comprise a conductive mesh, foil or coating, current collector, for example of a metal, such as nickel, equipped with at least one terminal or terminal attachment.

Correspondingly the cathode may suitably comprise a higher oxidation state transition metal compound, ie one in which the transition metal is in a higher oxidation stage from which it may be reduced to a lower oxidation state i.e. a potential oxidant. Such compounds include transition metal chalcogenides, such as oxides, sulphides and selenides, eg $TiS_2$, $V_2O_5$, $V_6O_{13}$, $V_2S_5$, $NbSe_2$, $MoO_3$, $MoS_3$, $MnO_2$, $FeS_2$, $CuO$, $CuS$, transition metal complex chalcogenides such as phosphosulphides, eg $NiPS_3$, and oxyhalides eg $FeOCl_2$ and $CrOBr$, transition metal complex nitrides such as halonitrides, eg $TiNCl$, $ZrNCl$ and $HfNBr$ and other transition metal salts eg $Cu_3B_2O_6$, $Cu_4O(PO_4)_2$, $CuBi_2O_4$, $BiO(CrO_4)_2$ and $AgBi(CrO_4)_2$. The cathode may as one, less favourable, alternative comprise a potential oxidant in the form of either an anion (p—) doped conductive polymer where the anion may be the same as that of the highly ionised salt, for example $CF_3SO_3^-$ or $AsF_6^-$ doped poly-p-phenylene, or a neutral polymer with an extended delocalised electron system which on reduction gives a salifiable ("conductive") polymer which is doped by the incorporation by diffusion in use of cations from the highly ionised salt of the solid electrolyte, for example reduced poly-p-phenylene n-doped with $Li^+$ cations.

Favoured compounds include $TiS_2$, $V_6O_{13}$ and $MnO_2$, in particular $V_6O_{13}$ in which the cathodic redox process is potentially reversible.

In use internal current conduction between anode and cathode take place via cation (eg $Li^+$) migration through the Solid Electrolyte.

Favourably, the cathode comprises a solid particulate dispersion of the potential oxidant and a highly conductive material in a matrix of a solid electrolyte, preferably (in a further aspect of the invention) in Solid Electrolyte.

Typical and preferred solid electrolytes within the cathode include those so described for the Solid Electrolyte hereinbefore.

Any material of a suitably high conductivity may be used in the dispersion, for example carbon black, acetylene black, or metals for example transition metals.

The proportions of the foregoing materials in the cathode will typically be in the ranges of 10 to 80% potential oxidant, preferably 30 to 60%; 1 to 30% dispersed conductive material, preferably 2 to 10%; and 10 to 80% solid electrolyte, preferably 30 to 60%.

All the above are weight percentages based on total cathode.

The disperse phase is generally present in particles of less than 40 micron grain size, eg less than 20 or less than 3 micron.

The cathode may be of any thickness provided it is cohesive and continuous, and it is clearly advantageous and preferred that it be as thin as possible provided that the cell does not rely on conduction in the plane of the cathode. The cathode may typically be from 1500 to 3 micron thick, for example 150 to 30 micron. It will be appreciated that at the lower thicknesses the cathode will have to be applied to a support, for example a cell wall and/or the electrolyte. It may even be necessary to form the cathode matrix in situ on such a support (matrix formation is described hereinbefore) having eg painted a precursor onto the support. As for the anode, such a support may be or comprise a conductive mesh, foil or coating current collector, for example of a metal such as nickel, equipped with at least one terminal or terminal attachment.

In a further aspect of the invention, the cathode may be made in substantially the same general manner and preferred manner as the Solid Electrolyte but with the additional step (d):
  (d) conventionally dispersing the potential oxidant and conductive material in a matrix or a precursor thereof.

In the case of a polymer matrix the steps are preferably carried out in the order (b), (d), (a) and (c).

The capacitor or cell assembly described above is desirably sealed into an insulative envelope, and preferably a moisture and air impervious one eg a barrier plastic. Where the assembly is in a preferred thin-film embodiment, it may be mounted flat and the cell assembly sandwiched by two thermoplastic films, of for example a polyester such as polyethylene terephthalate, or a polyethersulphone, the edges of which are heat-sealed optional with adhesive to enclose the assembly. This assembly may be further enclosed in eg a barrier plastic such as Viclan (ICI). It can also be mounted on a conventional circuit substrate and sealed to the substrate by a thermoplastics or thermoset cover. A larger surface area high capacitance embodiment of the capacitor or similar high-current embodiment of the cell is one in which the components are overlying strips made into a roll. In this case only one insulator layer is required, the assembly being sandwiched by the radially inner and outer faces of adjacent turns of the insulator. If desired the roll faces may be covered (to seal the assembly) with a layer of similar insulator.

The cell may be made up by conventional layering-/coating techniques. For example, where the cell is an elongate strip, a nickel mesh, foil or coating strip may be laid down (e.g. by evaporation) on, or secured to, an insulative thermoplastics sheet.

Thereafter, the cathode may be laid on the sheet or, in particular for very thin cathodes, a fluid precursor of the cathode (a solution or dispersion of the cathode materials in a suitable vehicle, for example acetonitrile, or, in the case of a cathode comprising any organic polymer, a precursor comprising a polymerisation precursor of the polymer) may be applied to the product sheet, eg using a doctor blade, followed by any necessary solvent removal/insertion and/or curing. The Solid Electrolyte may then be laid on the cathode, or, as for the cathode, a fluid precursor of the Solid Electrolyte may be applied and converted to the Solid Electrolyte. Finally, strips of anode (eg lithium) foil, any nickel current collector optionally on any insulator layer and the insulator layer itself may be applied in order. The order of steps may of course be reversed as desired. The insulator sheets may then be sealed around the edges, and any further encapsulation carried out.

The capacitor may be made up analogously.

Cells of the present invention are capable of current densities of more than 0.5 A/m$^2$ eg of the order of 1 A/m$^2$ and above. Typical voltages are in the range of 2.5 to 4 V. Energy densities in excess of 150 Wh/kg may be produced.

Use of the Solid Electrolyte is not confined to cells and capacitors, but extends to any high energy density application for which a solid state ionic conductor is suitable. For example, it may be used in a lithium salt embodiment with a conventional tungsten oxide composite electrode for electrically darkenable windows.

The present invention is illustrated by the following Examples. The preparation and properties of matrix precursors for the Solid Electrolyte is illustrated in the following Descriptions.

DESCRIPTION 1

Preparation of an Ethylene Oxide (EO)/Methyl Digol Glycidyl Ether (MDGE)/Allyl Glycidyl Ether (AGE) Matrix Precursor (Uncrosslinked Terpolymer) (D1)

Methyl digol glycidyl ether is of formula

A catalyst was made following the technique of E J Vandenberg, Journal of Polymer Science Part A-1 Vol 7 Pages 525-567 (1969) as follows. A 25% solution of $Et_3Al$ (Et means ethyl) in heptane was diluted with dry diethyl ether to a concentration of 0.5 moles per liter, cooled to 0° C. and water (0.5 mole/mole $Et_3Al$) was added dropwise with stirring over 15 mins. Acetylacetone (0.5 mole/mole $Et_3Al$) was added dropwise with stirring at 0° C. Stirring at 0° C. was continued for 15 mins; this was followed by stirring overnight at room temperature all steps being done under an inert nitrogen atmosphere.

The following materials were changed to a stirred nitrogen purged 400 ml stainless steel autoclave; MDGE (19 ml), AGE (4 ml), and toluene (200 ml). Catalyst as above (18 ml) and ethylene oxide (10 ml, as a liquid) were then added whilst continuing to stir throughout and the temperature raised to 110° C. for 2 hours. The hot viscous polymer solution produced was discharged into a 1 liter jar containing 5 ml methanol to inactivate the catalyst. The autoclave was given two hot washes with a total of 500 ml toluene. The washings were bulked with the polymer solution and thoroughly mixed.

The polymer solution was rotary evaporated to a volume of 300 ml and cast in a polyester tray in a fume cupboard and left overnight for the solvent to evaporate. The terpolymer was finally dried in a vacuum oven at 80° overnight to give 18.4 g of a sticky, rubbery product.

Molecular wt of the product was measured by gel permeation chromatography using lithium bromide in dimethylformamide as solvent.

MW = 380,000

100 MHz NMR was used to measure the relative amounts of the three monomers incorporated in the final terpolymer which were:
77.9 mole % EO
17.5 mole % MDGE
4.6 mole % AGE

EXAMPLE 1

(i) Incorporation of Salt in Matrix Precursor (Uncrosslinked Polymer); Measurement of Conductivity of Uncrosslinked Film 1 g of terpolymer (D1) was dissolved in 25 ml dry acetonitrile with stirring under a nitrogen atmosphere. Lithium triflate ($CF_3SO_3Li$) was added to the solution to give a ratio of 16:1 oxygen atoms present in the polymer to lithium atoms.

The solution was cast into a glass/polytetra fluoroethylene mould and the solvent allowed to evaporate slowly under a stream of nitrogen. The 200 μm film was dried at 80° under vacuum for 4 hours to remove any traces of water or solvent and its ionic conductivity over a range of temperatures was measured by standard AC impedance techniques.

Conductivity 20° C. = $2 \times 10^{-5}$ mho.cm$^{-1}$ (ii) Incorporation of Salt in Matrix Precursor (Uncrosslinked Polymer); Forming the Matrix by Cross-linking the Precursor (a) 1 g of terpolymer (D1) was dissolved in 25 ml acetonitrile with stirring and lithium triflate was added to give a 16:1 oxygen to lithium ratio. 1.0 wt % dry benzoyl peroxide was added to the solution which was cast as above into a 200 μm film under a stream of nitrogen.

The film was highly cross-linked by heating in a vacuum oven at 110° C. for 30 minutes.

Conductivity 20° C. = $3.5 \times 10^{-6}$ mho.cm$^{-1}$ (ii) Incorporation of Salt in Matrix Precursor (Uncrosslinked Polymer); Forming the Matrix by Cross-linking the precursor (a) 1 g of terpolymer (D1) was dissolved in 25 ml acetonitrile with stirring and lithium triflate was added to give a 16:1 oxygen to lithium ratio. 1.0 wt % dry benzoyl peroxide was added to the solution which was cast as above into a 200 μm film under a stream of nitrogen.

The film was lightly cross-linked by heating in a vacuum oven at 110°0 C. for 30 minutes.

Conductivity 20° C. = ;b $3.5 \times 10^{-6}$ mho.cm$^{-1}$ (b) An acetonitrile solution of terpolymer (D1) (85% w/w). lithium triflate (13% w/w) and benzoyl peroxide (2% w/w), was cast into a film, and the film was cured, as in a) above to give a 50 μm thick film.

(iii) Introducing the Liquid into the Matrix; adding Propylene Carbonate (PC)

Dry propylene carbonate was placed in the bottom of a dessicator and molecular sieve added to it. The dried cross-linked film from (ii)(a) above was placed in the vapour space above the liquid for an appropriate time at a total pressure of 1 to 2 mm of mercury at room temperature. In general about 25% of the propylene carbonate is taken up per hour based on the weight of the polymer and this rate is essentially constant for at least four hours. Solid Electrolytes (E1.1) to (E1.3) were produced in this way.

The procedure was repeated using the following liquids to produce the following Solid Electrolytes:

| | |
|---|---|
| Sulpholane | (E1.4) and (E1.5) |
| Methyl digol carbonate | (E1.6) and (E1.7) | all listed in the Table hereinafter.
all listed in the table hereinafter.

The dried cross-linked film from ii) b) above was similarly treated with PC to a 50% weight increase to give Solid Electrolyte (E1.10).

All these Solid Electrolyte films were easy to hangle and adequately dimensionally stable.

The films were kept dry before use in a cell.

DESCRIPTION 2

(i) Preparation of a Methoxypolyethoxyethyl Methacrylate (MPM) Matrix Precursor (Monomer) (D2.1)

Methoxy PEG 350, Me(OCH$_2$CH$_2$)$_{7.5}$—OH (145.8 g; dried over 4A molecular sieve), HPLC grade methylene chloride (80 ml) and dimethylaminopyridine (4.24 g) were added to a 500 ml flask with mechanical stirring. The flask was immersed in a cold water bath and methacrylic anhydride (65.0 g of 94% purity) added over 30 minutes from a dropping funnel. The reaction mixture was stirred for 17 hours at room temperature. The solution was transferred to a separating funnel and washed with 2×200 ml dilute HCl (40 ml conc. HCl in 360 ml water) followed by 2×200 ml 10% sodium bicarbonate solution followed by 2×200 ml water.

The solution was dried over MgSO$_4$.1H$_2$O and filtered. Irganox 1010 antioxidant (0.5 g) was added and the solution rotary evaporated and then pumped for 2.5 hours on the vac line with stirring.

Finally, the MPM was distilled on a short path still under vacuum (5×10$^{-3}$ mbar) at 230° C. Yield 115 g, stored in the freezer until required.

(ii) Preparation of an MPM/Allyl Methacrylate (AM) Matrix Precursor (Uncrosslinked Copolymer) (D2.2)

AM (ex Aldrich) was distilled under vacuum before use and passed down a column of 4A molecular sieve to remove the last traces of water. 1-Methoxy-1-methylsiloxy-2-methylprop-1-ene (MTS) (Aldrich) was distilled before use and stored in PTFE containers in the refrigerator. Tetrabutylammonium fluoride (TBAF) (Aldrich) supplied as a 1M THF solution was stood over CaH$_2$ for 2 days and filtered before use.

All operations were done under nitrogen in flame dried glass apparatus.

To a stirred solution of MTS (5.5×10$^{-3}$ g) in dry THF (10.0 ml) was added (D2.1) (3.0 g), AM (0.11 ml) and TBAF (2 $\mu$l of 1M THF solution). The mixture warmed up and was stirred overnight at room temperature. 50 ppm Irganox 1010 antioxidant was added to the very viscous clear solution, which was cast into a polyester tray in a stream of nitrogen. The last traces of THF were removed by heating in a vacuum oven at 60° for 4 hours.

Molecular wt of the product was measured by gel permeation chromatography using lithium bromide in dimethylformamide as solvent

MW=113,000

100 MHz NMR in CDCl$_3$ was recorded. There were virtually no free monomers in the copolymer and the ratio of MP 350 M units to AM units was 9:1.

EXAMPLE 2

(i) Incorporation of Salt in Matrix Precursor (Uncrosslinked Copolymer); Forming the Matrix by Crosslinking the Precursor Copolymer (D2.2) (1 g) was dissolved in 25 ml acetonitrile with stirring and lithium triflate was added to give a 16:1 oxygen to lithium ratio. 1.0 wt % dry benzoyl peroxide was added to the solution which was cast as in description 2 ii) into a 200 $\mu$m film under a stream of nitrogen. The film was cross-linked by heating in a vacuum oven at 110° C. for 30 minutes.

Conductivity=3.25×10$^{-6}$ mho cm$^{-1}$ (determined as in Example 7).

(ii) Introducing the Liquid into the Matrix; Addition of PC

As in Example 1(iii) with a similar rate of uptake to give Solid Electrolytes (E2.1) to (E2.3), all listed in the Table hereinafter.

DESCRIPTION 3

Preparation of an EO/MDGE Matrix Precursor (Uncrosslinked Copolymer) (D3)

As in Description 1, but omitting AGE and using 22 ml MDGE.

Yield 15 g; M Wt 431,000; Mole % MDGE 31.3.

EXAMPLE 3

(i) Incorporation of Salt in Matrix Precursor (Uncrosslinked Copolymer); Forming the Matrix by Crosslinking the Precursor Mixture Copolymer (D3) (1.062 g) and dry benzoyl peroxide (0.0244 g) were dissolved in 25 ml acetonitrile, with stirring and lithium triflate was added to give a 16:1 oxygen to lithium ratio. The solution was cast as in Example 2 into a 200 $\mu$m film under a stream of nitrogen. The film was cross-linked by heating in a vacuum oven at 110° C. for 4 hours. Cross-linked films produced in this way were very difficult to remove from the mould.

If the mould is immersed in liquid nitrogen, then the film usually separates cleanly. The films were re-dried by heating in a vacuum oven at 80° C. for 3 hours.

Conductivity of cross-linked copolymer film=6×10$^{-6}$ mho cm$^{-1}$ at 20° C. (determined as in Example 7).

(ii) Introducing the Liquid into the Matrix; Addition of PC

As in Example 1(iii) to give Solid Electrolytes (E3.1) to (E3.3) all listed in the Table hereinafter.

DESCRIPTION 4

Preparation of a Methacrylate End-capped Poly(ethylene Ether Carbonate) (Methacryloxy-poly(ethoxycarbonyloxyethoxy)ethyl Methacrylate) Matrix Precursor (Monomer) (D4)

Diethylene glycol (27.7 g) and dibutyl carbonate (44.5 g) were weighed into a test-tube fitted with a side arm and held under nitrogen. Sodium ethoxide solution (1 ml of 1.02 molar solution) was added by syringe. The reaction mixture was stirred magnetically. The tube was immersed in an oil bath at 150° C. The temperature was raised to 200° C. over 1 hour at atmospheric pressure. The pressure in the apparatus was gradually lowered to a few mm of Hg over 3 hours, to distil off butanol essentially completely.

After cooling, the very viscous product resin was dissolved in chloroform (100 ml) and washed in a separating funnel with dilute HCl (10 ml conc HCl/40 ml water) and then water (3×60 ml).

The solution was rotary evaporated and the resin dried under vacuum at 180° C. for 2 hours.

Molecular weight was determined by VPO in methyl benzoate at 136° C. and found to be 1810±10%.

Dimethylaminopyridine (0.1 g) was added to this product hydroxyl terminated oligomer (5 g) followed by methacrylic anhydride (2.17 g; Aldrich, 94% pure) in a reaction flask blanketed with nitrogen. The reaction mixture was stirred magnetically at 80° C. for 3 hours. The excess methacrylic anhydride was distilled out under vacuum at 80° C. The resin was dissolved in methylene chloride and transferred to a separating funnel and washed once with dilute HCl and then three times with water. The solution was dried with MgSO$_4$.1H$_2$O and filtered. 200 ppm 4-methoxyphenol antioxidant was added and the solution rotary evaporated until most of the methylene chloride had come off. The last of the methylene chloride was removed in a dry air stream over 4 hours.

EXAMPLE 4

(i) Incorporation of Salt in Matrix Precursor (Monomer); Forming the Matrix by Polymerising and Cross-linking the Precursor Mixture A casting solution was prepared from resin (D4) (2.357 g), lithium triflate (0.3749 g), and dry benzoyl peroxide (0.046 g) in HPLC grade acetonitrile (20 ml) with stirring under nitrogen.

2 ml of this solution was placed in a glass mould coated with a mould release agent. The mould was placed in an oven with nitrogen blowing through it. The temperature was raised to 110° C. at 2° C./minute, held at 110° C. for 2 hours and slow cooled to room temperature overnight.

The clear rubbery film could be pulled easily from the mould.

Conductivity at 20° C. = $1.3 \times 10^{-9}$ mho cm$^{-1}$ (determined as in Example 7).

(ii) Introducing the Liquid into the Matrix; Addition of PC

As in Example 1(iii) to give Solid Electrolyte (E4.1) listed in the Table hereinafter.

It proved difficult to incorporate any further propylene carbonate into the film by this method. An alternative method was to suspend the film in a dry solution of lithium triflate in propylene carbonate (1 molar). The film was dried by pressing between filter papers. This procedure was in a dry box, to give Solid Electrolyte (E4.2) listed in the Table hereinafter.

EXAMPLE 5

(i) One-pot Preparation of an MPM/Polyethylene Glycol Dimethacrylate (PDM) Matrix (Cross-linked Polymer) including Salt Polyethylene glycol 400 dimethacrylate (0.05 g; Polysciences), MPM (D2.1) (2.0 g) and dry benzoyl peroxide (0.02 g) were co-dissolved in 20 ml HPLC grade acetonitrile. Lithium triflate was added to the solution to give a ratio of 16:1 oxygen atoms present in the oligomers to lithium atoms.

2 ml of this solution was cast and cured as in Example 4, but at 80° C. for 24 hr.

(ii) Introducing the Liquid into the Matrix; Addition of PC

As in Example 1(iii) to give Solid Electrolytes (E5.1) to (E5.4), all listed in the Table hereinafter.

DESCRIPTION 6

Preparation of a Polysiloxane Matrix Precursor (Uncrosslinked Copolymer) (D6)

A silicon compound of formula

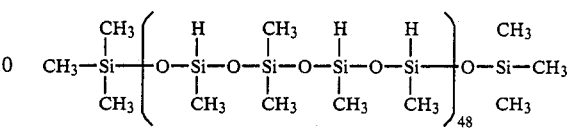

(4 g) and a compound of formula CH$_3$CH$_2$=CHCH$_2$O(C$_2$H$_4$O)$_{9.5}$CH$_3$ (6 g) were dissolved in dry toluene (10 ml) and 1.0 ml of a solution of trans PtCl$_2$[(C$_2$H$_5$)$_2$S]$_2$ (1 mg dissolved in 1 ml of toluene) added.

This mixture was refluxed under N$_2$ for 2.5 hours, to give a fairly viscous solution. The toluene was removed under vacuum to give a very viscous copolymer (D0.6).

EXAMPLE 6

(i) Incorporation of Salt into Matrix Precursor (Uncross-linked Copolymer)

6.218 g of copolymer (D6) and 0.6223 g lithium triflate (b 0.6223 g) (O:Li ratio=20:1) were co-dissolved in 5 ml acetonitrile with stirring. 5 ml dioxane was added to reduce the evaporation of acetonitrile. The solution was cast onto the stainless steel electrodes of conductivity cells and solvent allowed to evaporate for 1 hour in air.

(ii) Forming the Matrix by Cross-linking the Precursor

Copolymer coated electrodes were cured in air and argon as described below.

Air

The electrodes were heated rapidly to 140° C. and held at 140° C. for 20 minutes in an oven and immediately removed from the oven.

Conductivity was $5.2 \times 10^{-6}$ mho cm$^{-1}$ (determined as in Example 7).

Film thickness was 170 µm.

Argon

Films were cast under argon and placed in an argon flushed oven. The oven was heated to 60° for 25 minutes and slowly allowed to cool to room temperature overnight.

(iii) Introducing the Liquid into the Matrix; Addition of PC

PC was incorporated into the 'air' films above, as in Example 1(iii), whilst still attached to the electrodes, to give Solid Electrolytes (E6.1) to (E6.3), all listed in the Table hereinafter.

EXAMPLE 7

Measurement of Conductivity of the Solid Electrolyte

The ionic conductivity of the foregoing Solid Electrolyte films was measured by standard Ac impedance techniques using a Solartron 1250 frequency response analyser. The results are shown in the following Table, in which the '% liquid' is the weight % of liquid in the Solid Electrolyte, '% Increase' is the number of parts by weight liquid taken up by the penultimate film in the final process step taken as 100 parts, and conductivities are at 20° C. unless otherwise indicated in or by following brackets.

TABLE

| Solid Electrolyte | % Liquid | % Increase | Conductivity mho·cm$^{-1}$ × 10$^4$ |
|---|---|---|---|
| (E1.1) | 16.7 | 20 | 1.6 (25) |
| (E1.2) | 28.6 | 40 | 3.0 (25) |
| (E1.3) | 37.5 | 60 | 5.4 (25) |
| (E1.4) | 33.2 | 47 | 0.52 |
| (E1.5) | 49.3 | 96 | 0.96 |
| (E1.6) | 13.0 | 15 | 0.17 |
| (E1.7) | 44.4 | 80 | 0.39 |
| (E1.8) | 41.2 | 71 | 1.55 |
| (E1.9) | 60 | 150 | 4.8 |
| (E2.1) | 16.7 | 20 | 1.1 |
| (E2.2) | 28.6 | 40 | 2.15 |
| (E2.3) | 37.5 | 60 | 3.6 |
| (E3.1) | 15 | 18 | 1.3 |
| (E3.2) | 20 | 25 | 1.8 |
| (E3.3) | 33.3 | 50 | 3.6 |
| (E4.1) | 33.3 | 50 | 0.23 |
| (E4.2) |  | 80 | 1.2 ] * |
| (E4.3) |  | 140 | 2.0 ] * |
| (E4.4) |  |  |  |
| (E4.5) |  | 180 | 0.48 |
| (E5.1) | 28.8 | 40 | 2.3 |
| (E5.2) | 33.3 | 50 | 3.2 |
| (E5.3) | 37.5 | 60 | 4.0 |
| (E5.4) | 41.2 | 70 | 5.2 |
| (E6.1) | 16.7 | 20 | 1.0 ] ** |
| (E6.2) | 28.6 | 40 | 2.3 ] ** |
| (E6.3) | 40.0 | 66 | 6.0 |

*% increase may include added salt
*Determined as in Example 6

EXAMPLE 8

Preparation of a Composite Cathode (C1) comprising the Solid Electrolyte

A solution as in Example 1(ii) (b) above, but containing in place of 85% w/w terpolymer (D1), 85% w/w of a mixture of which 50% w/w was terpolymer (D1), and the remaining 50% w/w was a dispersion of MnO$_2$ powder (45% w/w) and carbon black powder (5% w/w), was cast and cured as in Example 1(ii) (b) to give a 60μ thick film cathode (C1).

EXAMPLE 9

A Cell Assembly Comprising the Solid Electrolyte

The assembly of a cell in accordance with the present invention is described below with reference to the accompanying drawings (not to scale) in which.

Figure 1:
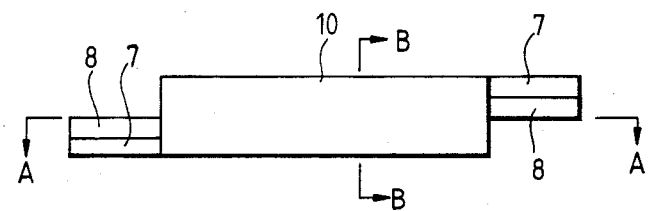
FIG. 1 is a side elevation of the cell assembly.
Figure 2:
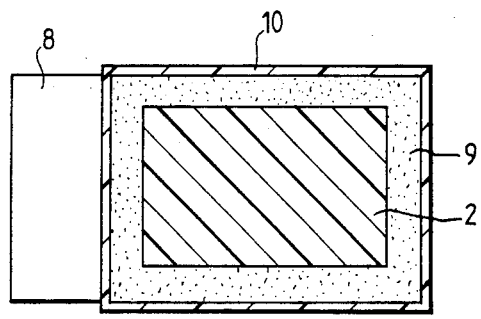
FIG. 2 is a plan section of the assembly viewed along AA in FIGS. 1 and 3.
Figure 3:
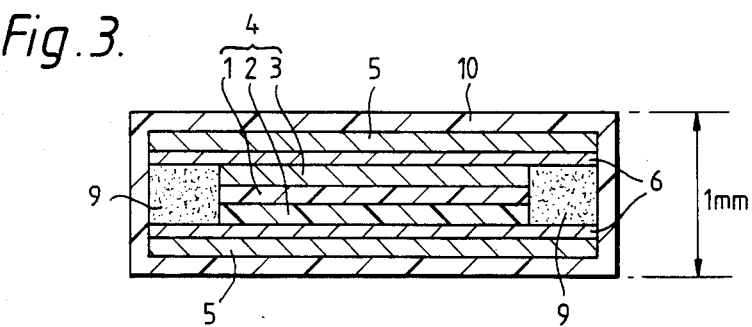
FIG. 3 is a cross section of the cell assembly viewed along BB in FIG. 1.

The film 1 of Solid Electrolyte (E1.10) prepared in Example 1(ii) (b) was sandwiched between and bore resiliently against a coterminous layer 2 of cathode film C1 (Example 8) and a coterminous 50 μm thick lithium foil 3 anode (the layer, film and foil being mutually in register) to produce a cell 4, 600 mm$^2$ in plan area.

The cell 4 was heat-sealed between two sheets 5 of polyester (Melinex; ICI), each coated, on the face so biased into electrical contact with the anode or cathode of the cell, with a nickel coat 6 (100 μm thickness of nickel on 120 82 m thick plastics film) acting as a current collector from the anode or cathode respectively.

The sheets 5 were of the same planar dimensions although larger than the cell 4 in plan and were sealed around the cell 4 with only their long edges in register, to form end lugs 7 with metal faces 8. Sealing was effected around the edges of the cell 4 with a layer 9 of adhesive. The sealed cell (excluding most of the lugs 7) was coated with a layer 10 of an air and water impervious barrier polymer (Viclan, ICI). The projecting lugs 7 were used for external connections to the cell, and may if desired be fitted with appropriate terminals.

The resulting cell assembly cell assembly was less than 1 mm thick, had an open circuit voltage of 3.2 V, and produced a steady current density of about 120 μA cm$^{31\ 2}$ at room temperature.

EXAMPLE 10

Preparation of a Composite Cathode (C2) comprising the Solid Electrolyte

A solution and dispersion as in Example 8 but using a polyphenylene powder in place of MnO$_2$ powder was similarly processed to give a film cathode (C2).

The polyphenylene used was supplied by ICI and/or is preparable by the methods described in EP-A No. 76,605 and EP-A No. 107,895.

EXAMPLE 11

A cell assembly was produced analogously to Example 9, but using the cathode (C2) in place of cathode (C1).

This assembly was charged at a constant current of 50 μA to p-dope the polyphenylene as:

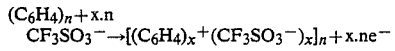

$(C_6H_4)_n + x.n$
$CF_3SO_3^- \rightarrow [(C_6H_4)_x^+ (CF_3SO_3^-)_x]_n + x.ne^-$ The resulting cell had an open circuit voltage of above 3.7 V and a good steady working current.

EXAMPLE 12

Preparation of further Composite Cathodes comprising the Solid Electrolyte

Precursors of all the Solid Electrolytes of the Table may be used with the potential oxidants of Examples 8 and 10 and processed analogously to form corresponding composite cathodes.

EXAMPLE 13

Further Cell Assemblies comprising the Solid Electrolyte

All the Solid Electrolytes in the Table may be used (optionally with a corresponding composite cathode of Example 12) to form cell assemblies analogously to that of Example 9.

We claim:

1. A solid electrolyte for an electrochemical cell, which comprises:
    (a) a matrix of cross-linked polymer chains, having side chains linked thereto, which side chains comprise polar groups free from active hydrogen atoms,
    (b) a polar aprotic liquid dispersed in the matrix, and
    (c) an ionised monomeric ammonium or alkali metal or alkaline earth metal salt dissolved in the matrix and/or liquid.

2. A solid electrolyte according to claim 1 wherein the aprotic polar liquid is one with a dielectric constant of at least 50 and/or a dipole moment of at least 3 Debye.

3. A solid electrolyte according to claim 2 wherein the aprotic polar liquid is ethylene or propylene carbonate, a dialkylformamide or -sulphoxide, a cyclic ether, sulpholane or a bis(polyalkoxyalkyl)carbonate, or a cyclic amide.

4. A solid electrolyte according to claim 1, wherein the liquid is present in the matrix at 35 to 200 parts by weight per 100 parts by weight of the matrix.

5. A process for preparing a solid electrolyte according to claim 1 in any feasible order:
 (a) forming the matrix
 (b) incorporating the highly ionised salt in the matrix or a precursor thereof, and
 (c) introducing the aprotic liquid into the matrix or a precursor thereof.

6. A cathode for an electrochemical cell, which comprises a solid dispersion of a potential oxidant and a highly conductive material in a matrix of a solid electrolyte according to claim 1.

7. A cathode according to claim 6 comprising 30 to 60% $MnO_2$ and 2 to 10% carbon black, acetylene black or a transition metal (w/w on total cathode) as particles of less than 40 micron grain size.

8. A process for preparing a cathode according to claim 6 comprising in any feasible order:
 (a) forming the matrix
 incorporating the highly ionised salt in the matrix or a precursor thereof,
 (c) introducing the aprotic liquid into the matrix or a precursor thereof, and
 (d) conventionally dispersing the potential oxidant and conductive material in the matrix or a precursor thereof.

9. An electrochemical cell which comprises a conductive anode and cathode capable of mutual electrochemical reaction and separated by a solid electrolyte according to claim 1.

10. A cell according to claim 9 wherein the cathode comprises a solid dispersion of a potential oxidant and a highly conductive material in a matrix of a solid electrolyte, and comprises 30 to 60% $MnO_2$ and 2 to 10% carbon black, acetylene black or a transition metal (w/w on total cathode) as particles of less than 40 micron grain size.

* * * * *